Aug. 27, 1940. G. W. KOWALSKY 2,212,693
HEADLIGHT
Filed Feb. 12, 1938
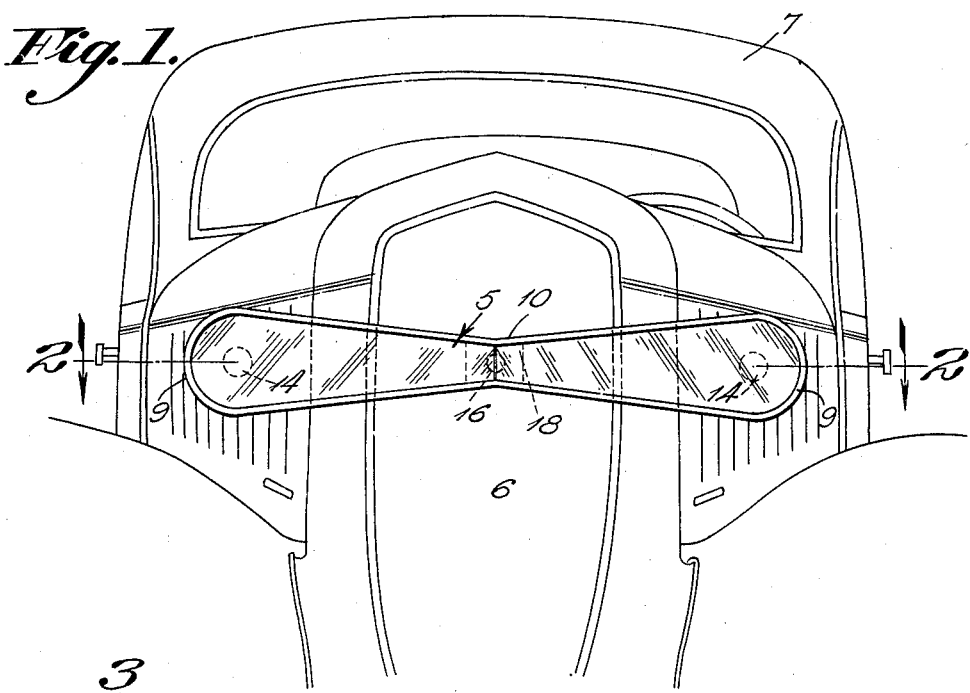
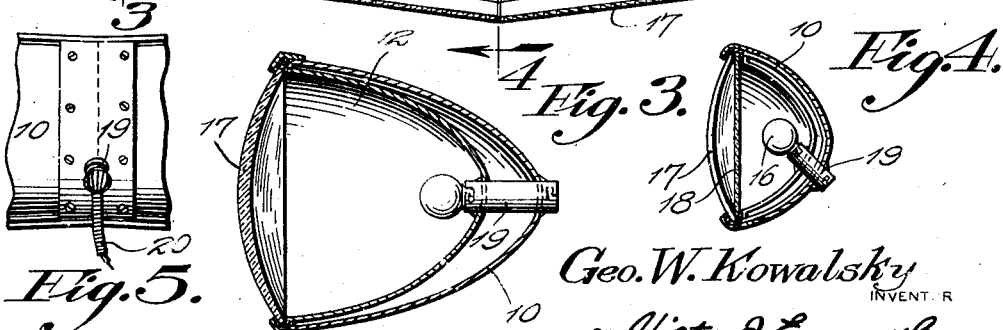

Patented Aug. 27, 1940

2,212,693

UNITED STATES PATENT OFFICE 2,212,693

HEADLIGHT

George W. Kowalsky, Wisconsin Rapids, Wis., assignor of one-half to John J. Malicke, Wisconsin Rapids, Wis.

Application February 12, 1938, Serial No. 190,319

2 Claims. (Cl. 240—7.1)

My invention relates to headlights and more particularly to headlights adaptable for use on motor vehicles.

One of the principal objects of my invention is to provide a headlight for a motor vehicle wherein rays from an auxiliary light source are utilized for illuminating a section of a headlight upon extinguishment of a light source contained therein.

Another object of my invention is to provide a headlight of the above described character adapted to contain a plurality of light sources therein for reflecting light rays from the sides of a motor vehicle as well as from the front thereof.

A further object of my invention is to provide a headlight of the above described character wherein an auxiliary or parking light source serves to illuminate headlight areas on both sides of the radiator of a motor vehicle.

A still further object of my invention is to provide a headlight of the above described character which is simple in construction, efficient in operation and economical in manufacture.

Other objects and advantages will be apparent from the following description, appended claims and annexed drawing.

Referring to the drawing wherein like reference characters designate like parts throughout the several views:

Figure 1 is a front elevation of a section of a motor vehicle illustrating my invention secured thereto.

Figure 2 is a sectional view of my invention taken on the line 2—2 of Figure 1.

Figures 3 and 4 are sectional views taken on the lines 3—3 and 4—4 of Figure 2, respectively.

Figure 5 is a fragmentary rear elevation of one of the end sections of my improved form of headlight.

In practicing my invention I provide a headlight 5 adapted to be disposed transversely of the radiator 6 of a motor vehicle 7 and said headlight comprises a longitudinally extending casing 8 having end and intermediate sections 9 and 10 respectively. The end sections extend rearwardly of the intermediate section and are secured to the motor vehicle by means of suitable brackets 11 attached thereto.

A reflector 12 of substantially a similar configuration as the casing is secured therein and fashioned with rearwardly extending sections 13 having inner reflecting surfaces adapted to reflect light rays from light sources, for instance electric bulbs 14, secured therein and an intermediate section 15 extending forwardly of the end sections and connecting the latter together. Said intermediate section likewise is provided with inner reflecting surfaces for reflecting light rays from an auxiliary light source, for instance an electric bulb 16 contained therein. Each of the end sections 13 are arranged rearwardly of the intermediate section a sufficient distance to permit the light rays from the bulb 16 to project on the reflecting surfaces thereof in advance of the bulbs 14 whereby to effect reflection of the rays from the bulb 16. A lens 17 is secured to the casing and extends across the front thereof and permits light rays from the light sources therein to be projected therethrough.

Mounted in the casing in front of the bulb 16 is a reflector 18 serving to reflect the rays from the bulb 16 upon the reflector 12 and end sections thereof and coacting therewith to accentuate the light source 14 when viewed from without the headlight. The bulbs 14 and 16 are secured within the reflector 12 by means of sleeves 19 having electrical connections therein for attachment to respective electric wirings 20 extending from the rear of the casing as illustrated in Figure 5. The intermediate section 15 is of a lesser diameter than the front portions of the end sections 13, thereby effecting a larger distribution of light towards the ends of the casing and at the sides of the radiator.

From the foregoing it will be apparent that for any reason should one of the bulbs 14 become extinguished or rendered useless, rays from the bulb 16 will project upon the reflecting surfaces in the end section containing the bulb and effect reflection of light rays therefrom to provide a light source on that particular side of the reflector. Furthermore, when a motor vehicle is parked, the bulbs 14 may be extinguished and the bulb 16 utilized as a parking light which will serve to illuminate the end sections 13 in the same manner as if a pair of dimly illuminated headlights were provided.

What I claim is:

1. A headlight comprising a casing adapted to be disposed transversely of a motor vehicle radiator, a reflector secured within said casing and coextensive therewith, said reflector fashioned with rearwardly extending lateral end portions adapted to be disposed rearwardly of the front and laterally of the sides of said radiator, light sources disposed axially within said portions, said end portions having outer reflecting surfaces of deep conic sections for forwardly reflecting light rays from said sources, intermediate portions extending forwardly beyond the forward edges of said end portions and narrowing to a central convex surface, an auxiliary light source at the junction of said intermediate portions, said intermediate portions connecting said end portions together and having reflecting surfaces coacting with said first mentioned reflecting surfaces to establish a continuous light reflecting area between said end portions and to reflect light rays from said auxiliary source; said first and last mentioned reflecting surfaces cooperating to permit light rays from said auxiliary source to enter said end portions to be reflected forwardly thereby, whereby to effect reflection of the light rays from said auxiliary light source from an end portion upon extinguishing of the light source contained therein and to maintain said area in illuminated condition; and a lens secured to said casing and enclosing all of said reflective surfaces and light sources.

2. The structure of claim 1 as set forth and defined therein including, an auxiliary reflector arranged forwardly and centrally of said auxiliary light source and coacting with said first mentioned reflector to accentuate light rays reflected into said end portions by said auxiliary light source.

GEORGE W. KOWALSKY.